Oct. 21, 1969          R. W. COSTIN          3,473,776
ASSEMBLY FOR VERTICAL ADJUSTMENT OF SEAT CUSHION
Filed April 21, 1967          2 Sheets-Sheet 1
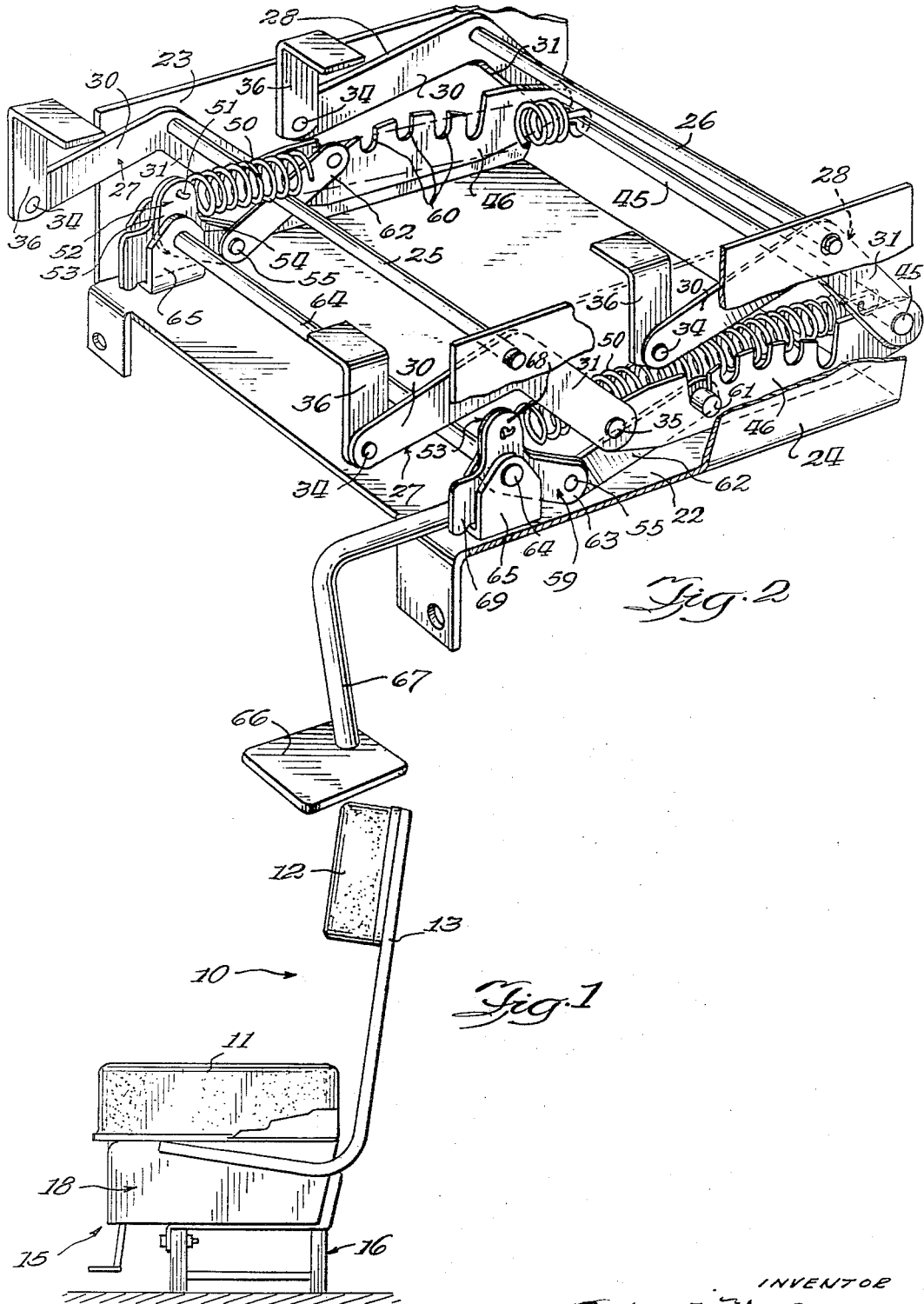
INVENTOR
Robert W. Costin
BY Merriam, Marshall, Shapiro & Klose
ATTORNEYS

United States Patent Office 3,473,776
Patented Oct. 21, 1969

3,473,776
ASSEMBLY FOR VERTICAL ADJUSTMENT
OF SEAT CUSHION
Robert W. Costin, Clawson, Mich., assignor to Coach and
Car Equipment Corporation, Elk Grove Village, Ill., a
corporation of Illinois
Filed Apr. 21, 1967, Ser. No. 632,698
Int. Cl. B60n 1/02
U.S. Cl. 248—419          3 Claims

ABSTRACT OF THE DISCLOSURE

Seat mounted on one arm of V-shaped pivoting links for movement through arc the major component of which is vertical. Seat-locking mechanism includes latch-engaging member connected to other arm of links and mounted for movement, responsive to movement of seat, through arc the major component of which is horizontal. Spring has one end connected to other arm of links for biasing seat upward. Other end of spring connected to disengageable latch to increase bias in spring as latch is disengaged.

BACKGROUND OF THE INVENTION

The present invention relates generally to adjustable seats, typically for off-the-road vehicles such as tractors, and more particularly to an assembly for adjusting the elevation of the seat.

Conventional assemblies for vertically adjusting a seat typically utilize a pair of straight links, one spaced behind the other, each having upper and lower ends pivotally connected to a seat cushion support member and a base member, respectively, to mount the seat cushion for movement, relative to the base, along an arcuate path. Means are provided to lock the seat cushion in any one of a plurality of preselected positions, along the arcuate path of movement; and the locking means generally include a plate having notches or holes, arranged in an arc corresponding to the arcuate path followed by the seat cushion, for engaging a latch element connected to the seat cushion support member and movable therewith. The link members are usually urged upwardly and rearwardly by an elongated coil spring having a forward end attached to the link members and a rearward end attached to the base. A typical prior art structure is illustrated in R. A. Bilancia U.S. Patent No. 3,191,312.

With the conventional prior art arrangement, described above, problems would arise in trying to raise the seat cushion from a relatively low position in which the link members extend almost horizontally from their pivotal connections to the base. With the link members at this angle, the vector of the rearward force exerted by the coil spring extends close to or through the pivotal axis of the link member so that there is very little leverage available to raise the cushion through the urging of the spring.

Another problem with the prior art arrangement was that a relatively large clearance was necessary between the base and the cushion support member to accommodate the locking plate with its arcuately arranged notches or holes, if the seat cushion was to be movable through an arc having a substantial vertical component. In such a case, the arc on the locking plate would have to have a substantial vertical component and this would require a locking plate with a relatively substantial height.

Moreover, with the conventional prior art arrangement of the type described above, it was difficult to lock the seat cushion in place, without looseness or play, when the cushion was moving along the lower parts of its arcuate path of movement.

SUMMARY OF THE INVENTION

All of the drawbacks of the conventional prior art arrangements, described above, are eliminated in an assembly constructed in accordance with the present invention. In this assembly, the front and back link members, located between the cushion support member and the base member, have a diverging or V-shaped configuration and are pivotally mounted to the base at the junction of the two arms of the V.

The first arm of each link member extends forwardly from the pivotal axis to a terminal end pivotally connected to the seat cushion support member. The second arm of each link member extends downwardly from the pivotal axis to a terminal end. The terminal end on the second arm of the front link member is pivotally connected to the front end of a rigid, horizontally extending member having a back end pivotally connected to the terminal end of the second arm of the back link member. The rigid member may constitute one of two locking elements and, in a typical embodiment, include notches or holes arranged in an arc, the major component of which is horizontal.

The arrangement of the assembly is such that the first arms of the link members, and the cushion support member, are mounted for movement along a first arcuate path, the major component of which is vertical, while the second arms, together with the horizontally extending rigid member, are mounted for movement along a second arcuate path, the major component of which is horizontal.

Because the notches or holes in the locking member are arranged in an arc extending horizontally rather than vertically, the locking member can be relatively small in vertical dimension; and a large vertical spacing need not be provided between the base member and the cushion support member to accommodate the locking member.

No problems are presented in locking the cushion support member in any one of several preselected positions along its arc of movement, no matter how low the position.

When the first arms of the link members extend horizontally forwardly, the second arms extend downwardly and rearwardly; and a spring, for urging the first arms upwardly, has a back end connected to the terminal ends of the second arms and a front end connected to the base. When the first arm is horizontal, the spring is urging the second arm downwardly and forwardly, thus, in turn, urging the first arm upwardly and rearwardly. The arrangement is such that adequate leverage is provided to return the first arm to an upwardly extending position. Thus, the seat cushion may be lowered until the first arms of the link members extend horizontally forwardly or even below a horizontal plane passing through the axes of the link members' pivotal mountings on the base; and there is no difficulty in raising the cushion from this position.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIGURE 1 is a side elevational view of a seat including an assembly, for vertically adjusting the seat, constructed in accordance with an embodiment of the present invention;

FIGURE 2 is an enlarged, fragmentary, perspective view, partially cut away, illustrating an embodiment of an assembly in accordance with the present invention.

DESCRIPTION OF THE PREFERRED EMBODIMENT

Figure 3:
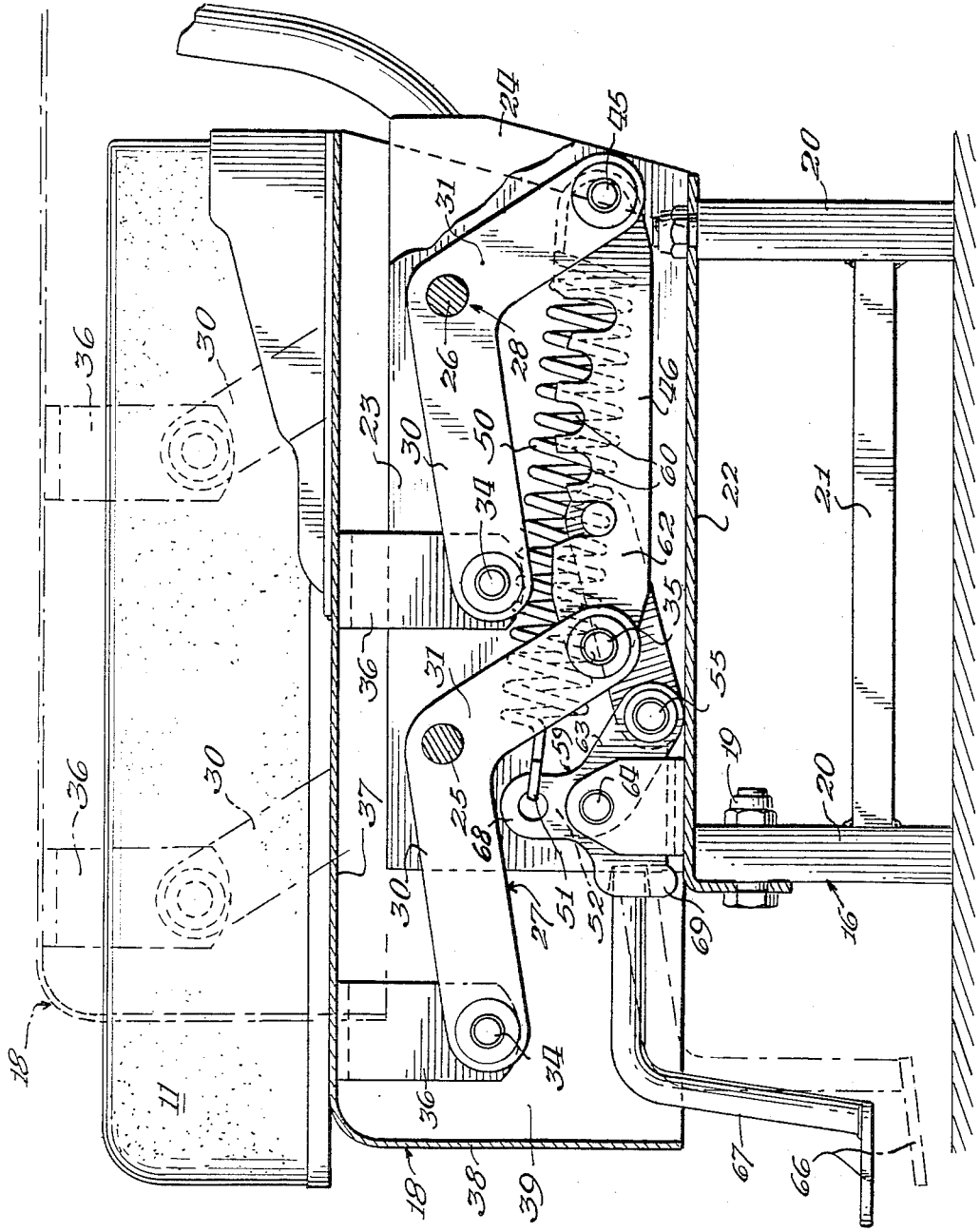
FIGURE 3 is an enlarged, fragmentary, side elevational view, partially in section, of the embodiment of FIGURE 2.

Referring initially to FIGURE 1, there is illustrated generally at 10 a seat comprising a seat cushion 11 and a back rest 12. Cushion 11 rests upon and back rest 12 is connected by a frame 13 to an assembly, indicated generally at 15, for vertically adjusting seat 10.

Assembly 15 includes a cushion support member indicated generally at 18 supported atop a base indicated generally at 16.

Referring now to FIGURES 2 and 3, base 16 includes legs 20 braced by cross-piece 21 and supporting a base plate 22 connected to legs 20 by nuts and bolts, at 19. Extending upwardly from base plate 22 are a pair of side plates 23, 24; and extending between side plates 23, 24 are a front shaft 25 and a rear shaft 26. Pivotally mounted on front shaft 25 are a pair of front link members, 27, 27; and pivotally mounted on rear shaft 26 are a pair of rear link members 28, 28.

Each link member 27, 28 includes first and second arms 30, 31 each extending radially, in a different direction, from a mutual junction at the pivotal axis 25, 26 of the respective link member 27, 28; and the link members are essentially V-shaped.

Each link member's first arm 30 has a terminal end pivotally connected at 34 to an ear 36 depending from the top portion 37 of cushion support member 18 which also includes a depending front portion 38 and a pair of depending side portions only one of which, 39, is shown (in FIGURE 2).

The second arm 31 of front link member 27 has a terminal end pivotally connected at 35 to the front end of a rigid member 46 having a back end pivotally connected by a shaft 45 to the terminal end of second arm 31 on rear link member 28.

Shaft 45 extends between the two rear link members 28; and connected to shaft 45 are the back ends of a pair of elongated coil springs 50 having front ends connected at 51 to an upwardly extending arm 52 of an element 53 mounted for pivotal movement about the axis of a shaft 64 extending between brackets 65, 65 mounted on opposite sides of base plate 22 near the front thereof. Element 53 also includes a downwardly and rearwardly extending arm 54 having a terminal end normally urged into abuttment with base plate 22 by springs 50.

Referring to FIGURE 3, springs 50 are normally biased to urge rear link members 28 to pivot in a clockwise sense about their pivotal axis 26. Because rear link members 28 are connected by rigid member 46 to front link members 27, clockwise movement of the rear link members in turn causes clockwise movement of the front link members. Thus, springs 50 normally urge both link members 27, 28 to pivot in a clockwise sense about their pivotal axes 25, 26.

Link members 27, 28 are all mounted for simultaneous pivotal movement in which their first arms 30 move along a first arcuate path, typically between the solid line positions shown in FIGURE 3 and the positions shown in dash-dot lines in FIGURE 3. The arcuate path followed by first arms 30 is also the arcuate path followed by seat cushion support member 18 and seat cushion 11 during pivotal movement of the link members. The major component of this arcuate path is vertical.

As the first arms 30 move along their essentially vertical arcuate path, the second arms 31 move along a second arcuate path, the major component of which is horizontal.

Cushion 11 may be locked in any one of a plurality of preselected positions along its arcuate path of movement, utilizing a locking arrangement including rigid member 46. More specifically, member 46 includes a plurality of notches 60 for receiving a latching element in the form of a pin 61 on a link 62 rigidly fixed at 55 to the outer end of a rearwardly extending arm 63 of an element, indicated generally at 59, mounted for pivotal movement about the axis of shaft 64 extending between brackets 65, 65 on base plate 22.

When latch element 61 engages a notch 60, neither the seat cushion 11, the seat cushion support member 18, nor the link members 27, 28 are movable. When latching element 61 is disengaged from a notch 60, the seat cushion 11, seat cushion support member 18 and link members 27, 28 may be moved, in the manner previously described, either to raise seat cushion 11 or to lower seat cushion 11.

Raising seat cushion 11 is accomplished when link members 27, 28 pivot about their axes 25, 26 in a clockwise sense, as viewed in FIGURE 3; and lowering of seat cushion 11 is accomplished when the link members pivot about their respective axes in a counterclockwise sense.

Latching element 61 may be disengaged from a notch 60 by depressing a foot pedal 66 connected by a member 67 to the outer end of a forwardly extending arm 69 on element 59. Arms 63 and 69 extend in substantially radially opposite directions from shaft 64. Depression of foot pedal 66 pivots element 59 in a counterclockwise sense about the axis of shaft 64, in turn raising latch element 61 out of engagement with a notch 60.

To re-engage latch element 61 with a notch 60, one need merely release foot pedal 66.

Springs 50 have their front ends connected to a radially upwardly extending arm 68 on element 59 for urging element 59 in a clockwise sense about shaft 64, in turn urging latching element 61 into engagement with notch 60.

The terminal end of arm 63 on element 59 is rigidly fixed at 55 to the terminal end of arm 54 on element 53; and the front end of spring 50 is connected to the terminal end of arm 68 on element 59 as well as to the terminal end of arm 52 on element 53. Accordingly, when foot pedal 66 is depressed, element 53, as well as element 59, is pivoted in a counterclockwise sense, as viewed in FIGURE 3. This increases the bias on springs 50, thus increasing the force urging the link members to pivot in a clockwise sense which raises the seat cushion.

As illustrated in FIGURE 3, the link members may be pivoted to positions in which the front arms 30 extend at an angle below a horizontal plane passing through the pivotal axes 25, 26 of the link members. Despite the fact that arms 30 extend downwardly below their pivotal axes, they may be readily pivoted to the upwardly extending positions illustrated by the dash-dot lines 30 in FIGURE 3. This is because of the connection of the back end of springs 50 to the terminal end of the downwardly and rearwardly extending arms 31 on rear link members 28. With the arrangement illustrated, there is sufficient leverage for spring 50 to exert a substantial force to elevate seat cushion support member 18 and seat cushion 11, even when they are in the lowermost positions illustrated by the solid lines in FIGURE 3.

Because rigid member 46 moves along an arcuate path having a major component which is horizontal, and because notches 60 in the rigid member are arranged in a substantially horizontal arc, the entire rigid member can be located below the pivotal axes 25, 26 of the link members 27, 28 and no great clearance need be provided between base plate 22 and the top portion 37 of cushion support member 18 to accommodate the latching or locking arrangement. Thus, the adjusting assembly can be more compact, and the seat cushion can be located relatively lower than it would be if the latching arrangement was a stationary plate having a series of notches or holes arranged in an arc, the vertical component of which was relatively substantial.

Any tendency on the part of cushion 11 to move vertically from one of its preselected positions is translated into a tendency on the part of the notched rigid member 46 to move horizontally; and this movement is effectively checked by the latching element 61. Because the notched rigid member 46 cannot move horizontally, the cushion member is prevented from moving vertically. Thus, there is no looseness or play for any of the preselected positions in which the cushion 11 is locked.

The foregoing description has been given for clearness of understanding only, and no necessary limitations should be understood therefrom, as modifications will be obvious to those skilled in the art.

I claim:

1. An assembly for vertically adjusting a seat cushion, said assembly comprising:
   a base;
   a seat cushion support member located above said base;
   a pair of link members located between said seat cushion support member and said base, with one of said link members being located behind the other;
   means pivotally mounting the link members to the base;
   each of said link members including a pair of arms each extending radially, in a different direction, from the axis of said pivotal mounting to a terminal end for each arm;
   means, including a first arm on each link member, mounting the cushion support member for movement, relative to the base, along a first arcuate path the major component of which is vertical;
   a rigid member extending between the second arms on said link members and pivotally connected to each;
   means, including the second arm on each link member, mounting said rigid member for movement along a second arcuate path, the major component of which is horizontal, in response to said movement of the cushion support member along said first path;
   a pair of locking elements for locking said supporting member in any one of a plurality of preselected positions along said first arcuate path;
   said rigid member constituting one of said pair of locking elements and including a plurality of latch-engaging means;
   the other of said locking elements comprising latch means;
   means mounting said latch means on said base and for movement between a first position in engagement with said latch-engaging means and a disengaged second position;
   said assembly including spring means, having a back end connected to the terminal end of the second arm on one of said link members and a front end connected to the base, and normally biased to urge said cushion support member in an upward direction along its arcuate path of movement; and
   means, responsive to movement of the latch means from its first to its second position, for increasing the bias, in said spring means, which urges the cushion support member upwardly.

2. An assembly for vertically adjusting a seat cushion, said assembly comprising:
   a base;
   a seat cushion suport member located above said base;
   means mounting said cushion support member for movement, relative to the base, along an arcuate path having a vertical component;
   disengageable locking means for locking the cushion support member in any one of a plurality of preselected positions along said arcuate path;
   spring means normally biased to urge said cushion support member upwardly along its arcuate path of movement; and
   means, responsive to disengagement of said locking means, for increasing the bias in said spring means which urges the cushion support member upwardly.

3. An assembly as recited in claim 2 wherein said mounting means for the cushion support member comprises:
   a pair of link members located between said seat cushion support member and said base, with one of said link members being located behind the other;
   means pivotally mounting the link members to the base;
   each of said link members including a pair of arms each extending radially, in a different direction, from the axis of said pivotal mounting to a terminal end for each arm;
   means, including a first arm on each link member, mounting the cushion support member for movement, relative to the base, along a first arcuate path, the major component of which is vertical;
   a rigid member extending between the second arms on said link members and pivotally connected to each;
   means, including the second arm on each link member, mounting said rigid member for movement along a second arcuate path, the major component of which is horizontal, in response to said movement of the cushion support member along said first path;
   said rigid member constituting one of said pair of locking elements; and
   said disengageable locking means and the terminal ends of both of said second arms being located below the pivotal axes of both of said link members in all positions of the second arms and the rigid member on said second arcuate path.

References Cited

UNITED STATES PATENTS

| 2,357,825 | 9/1944 | Hickman et al. | 297—346 |
| 2,490,341 | 12/1949 | Davis et al. | 248—419 |
| 2,527,905 | 10/1950 | Barecki | 248—421 |
| 2,614,608 | 10/1952 | Ardussi | 248—419 |
| 3,137,473 | 6/1964 | Augunas | 248—423 |
| 3,390,857 | 7/1968 | Nystrom | 248—399 |

FOREIGN PATENTS

| 1,167,833 | 8/1958 | France. |

FRANCIS K. ZUGEL, Primary Examiner

U.S. Cl. X.R.

248—421, 423